United States Patent Office 3,265,971
Patented August 9, 1966

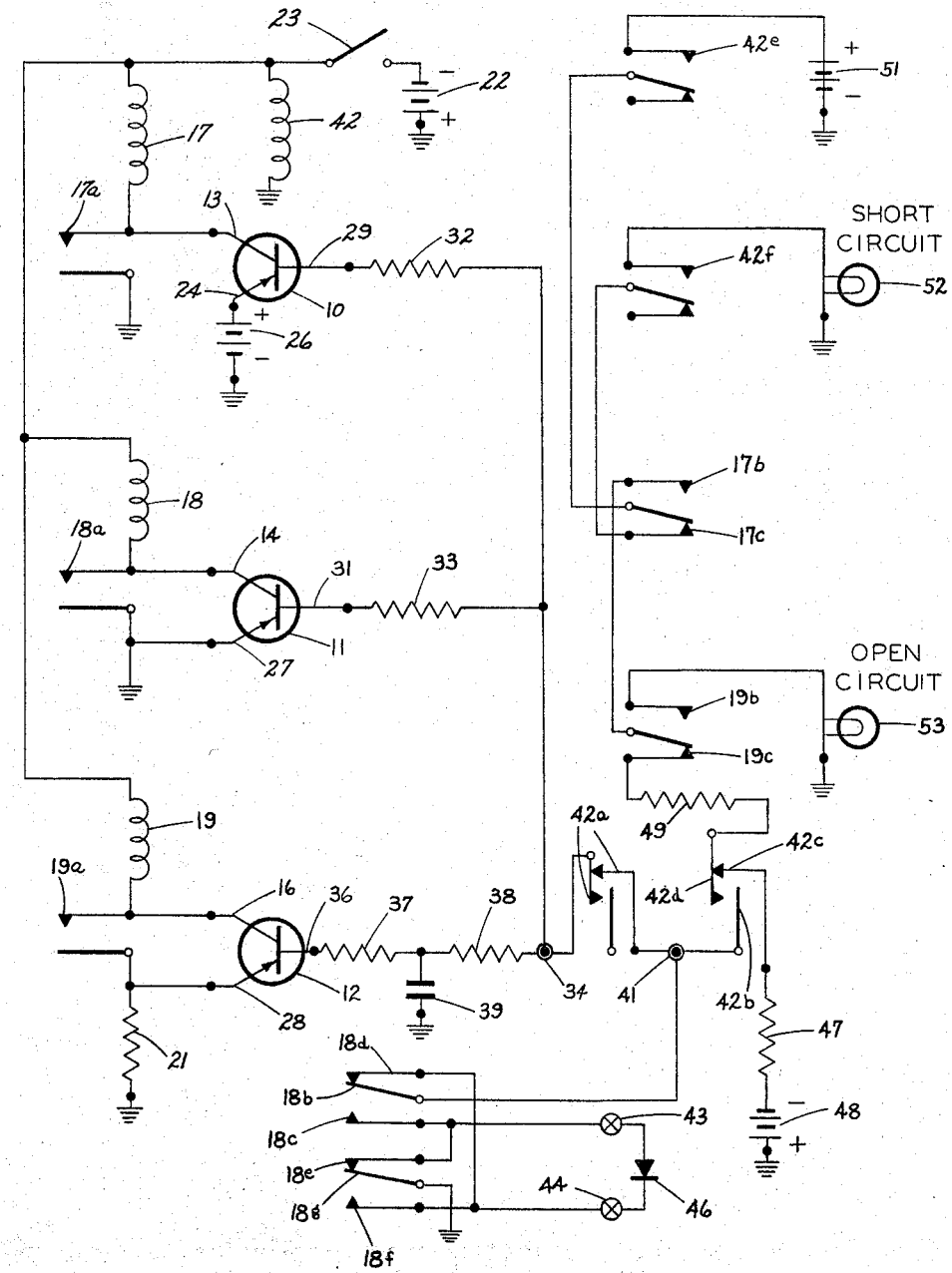

3,265,971
APPARATUS FOR TESTING ASYMMETRICALLY CONDUCTING ELECTRICAL DEVICE FOR OPENS, SHORTS, AND POLARITY ORIENTATION
Liber Joseph Montone, Reading, Pa., assignor to Western Electric Company, Incorporated, New York, N.Y., a corporation of New York
Filed July 11, 1963, Ser. No. 294,443
7 Claims. (Cl. 324—158)

This invention relates to electrical testing apparatus and, more particularly, to apparatus for testing asymmetrically conducting electrical devices.

In the manufacture of asymmetrically conducting devices, such as semiconductor diodes, it is necessary to electrically test the devices and in many instances to classify or sort them into various groups or codes according to the results of the test, all devices within a particular group having like electrical characteristics. Further, where large quantities of devices are involved, it is desirable that the testing and any necessary sorting be performed with a minimum expenditure of time and labor. This is best accomplished by utilizing an automatic test set, that is, a test set which both tests and sorts the devices automatically.

One of the problems involved with the use of such a test set is that the devices to be tested must be presented to the various test circuits thereof in a predetermined polarity orientation. Accordingly, where the entire operation of the test set is automatic and the devices are being fed individually from a randomly arranged supply of the same to the test set, it is necessary that means be provided for automatically sensing the polarity orientation of the devices and for orienting those of an undesirable orientation to a desirable one.

Even where the entire operation of the test set is not automatic, e.g., where the devices have a polarity marking thereon and are loaded manually into a test receiving receptacle of the test set, sensing and orienting means are necessary to preclude an acceptable device from being rejected in the event the operator inserts a device into the test receptacle incorrectly.

Further, it is often desirable to test the devices prior to their encapsulation, and/or after encapsulation and prior to their being marked with a polarity designation. The former type of testing is desirable, since otherwise a great deal of time and material would be expended in encapsulating defective devices. The latter type of testing is generally employed where the devices are to be sorted into a plurality of groups or codes according to the results of the testing and are to have their polarity and the code markings affixed simultaneously. In either type of testing, the lack of a polarity marking on the devices at the time of tests, necessitates that the test set have means for sensing the polarity orientation thereof and for orienting those which are of an undesirable orientation to a desirable one.

Automatic test sets generally run through all programmed tests regardless of the condition of a device being tested; accordingly, a second problem involved in the use of automatic test sets is the expenditure of time in testing devices which are manifestly bad, i.e., devices which are either short or open-circuited. This is especially vexatious where the devices may fall into one of a plurality of groups; since, in this instance, a multiplicity of tests are performed for each device characteristic, usually one for each code, resulting in a relatively long test time for each device.

Thus, as is seen from the foregoing, there is need for apparatus for use with automatic test sets which will rapidly and automatically determine whether asymmetrically conducting devices are short-circuited, open-circuited or of undesirable polarity orientations for further testing thereof, and which will orient those of an undesirable polarity to a desirable one.

It is therefore an object of this invention to provide new and improved electrical testing apparatus.

It is another object of this invention to provide new and improved apparatus for testing asymmetrically conducting electrical devices.

It is a further object of this invention to provide new and improved apparatus for rapidly and automatically testing asymmetrically conducting electrical devices to determine whether the devices are short-circuited, open-circuited or of an undesirable polarity orientations for further testing or processing thereof, and for orienting those of an undesirable orientation to a desirable one.

Apparatus illustrating certain features of the invention may include means for supplying a unidirectional test current connected to an asymmetrically conducting electrical device during a predetermined interval of time, the magnitude of the voltage appearing across the device being dependent upon the conductivity thereof, relative to the supplying means. First, second and third voltage responsive means, respectively operable from first to second states in accordance with the voltage appearing across the device and in a predetermined sequence, are provided for connection to the device during the predetermined time interval.

In a preferred embodiment, the apparatus is employed to test semiconductor diodes to determine whether the diodes are short-circuited, open-circuited or of an undesirable polarity orientation for further testing thereof, and to orient those diodes of an undesirable orientation to a desirable one. According to this aspect of the invention, a first relay having make-before-break contacts is provided for connecting during its armature transfer time (transit time) a diode to be tested to a unidirectional current source and to three transistor switches. Each of the switches is operable from an "OFF" to an "ON" state, the operating time for each switch being different, and each is provided with a relay in its output.

If the diode is short-circuited, upon its connection to the current source and to the three transistor switches a relatively low voltage insufficient to operate any of the switches will appear thereacross, resulting, at the end of the transit time of the first relay, in actuation of a short-circuit indicating unit.

Conversely, if the diode is open-circuited or poled in the reverse direction with respect to the current source, a relatively high voltage sufficient to operate all three switches will appear across the diode. Operation of a first one of the switches to its "ON" state energizes its relay to disable the short-circuit indicating unit, and operation, shortly thereafter, of a second one of the switches to its "ON" state energizes its relay to reverse the connections of the diode to the current source. If the diode is open-circuited, upon its reversal the voltage thereacross continues to be relatively high and, after another time interval, the third switch operates to its "ON" state, resulting in energization of its relay to actuate an open-circuit indicating unit. However, if the diode was initially poled in the reverse direction with respect to the current source, upon its reversal it will be connected in its forward direction, and a relatively low voltage insufficient to operate the third switch will be developed thereacross, resulting in this switch remaining in its "OFF" state and non-actuation of the open-circuit indicating circuit. Since the diode is now in a desirable orientation, at the end of the transit time of the first relay further testing thereof can proceed.

If the diode is initially connected to the current source in its forward direction and is neither shorted, nor open-circuited, a voltage sufficient to operate only the first switch is developed across the device to cause disabling of the short-circuit indicating unit and to enable further testing of the device at the end of the transit time of the first relay.

One very advantageous and important feature of such apparatus is its simplicity and its ability to perform the testing in a relatively short time, that is, during the transit time of a single relay. This feature becomes even more advantageous when the invention is incorporated into automatic test sets. Generally, automatic test sets include a start relay which is energizable by a start switch to apply a test bias to the device. Thus, by using this start relay as the first relay in the embodiment of the invention described above, short-circuit and open-circuit testing and orientation, if necessary, may be accomplished without any additional expenditure of test time.

Another very advantageous and important feature of such apparatus is its ability to be employed as a "fail-safe" apparatus, that is, as a means for checking the integrity of the connections from the various test stations in a sequential type automatic test set to a device being tested. Without any "fail-safe" or checking apparatus, devices which are defective may be passed as good and vice versa. Thus, for example, if the devices are connected in a test circuit which functions to indicate as acceptable all devices whose forward conductivity is greater than a predetermined value and indicate as a reject all those whose forward conductivity is less than this value, and the connections to the devices are short-circuited, all devices whether good or bad would pass the test and be designated as acceptable. However, by employing apparatus in accordance with the present invention with each of the test stations of the test set, if the connections from a test station to a device under test fail in some manner and become shorted or open-circuited, these conditions will be indicated for all devices being tested and it will at once become evident to an operator that the test set is malfunctioning.

Other objects, advantages and features of the invention will be more readily understood from the following detailed description when read in conjunction with the single drawing which illustrates schematically an embodiment of the invention employed to test asymmetrically conducting electrical devices to determine whether the devices are short-circuited, open-circuited or of undesirable polarity orientations for further testing, and for orienting those of undesirable polarity orientations to a desirable one.

Referring now to the drawing, the embodiment of the invention depicted therein includes three identical PNP transistor switches 10, 11 and 12, such as the Western Electric Company 2N528 or 2N1174 types. The respective collectors 13, 14 and 16 of the transistor switches 10, 11 and 12 are connected to respective relays 17, 18 and 19, each of which is energizable at a voltage and in a time identical to the others. The relays 17 and 18 have the ends thereof which are tied to the collectors 13 and 14, respectively, connected through normally open contacts thereof 17a and 18a, respectively, to ground, and the relay 19 has the end thereof which is tied to the collector 16 connected through a normally open contact thereof 19a and a resistor 21 to ground. The other ends of the relays 17, 18 and 19 are connected to each other and to a suitable D.C. voltage source, such as a battery 22, through a normally open start switch 23, the battery serving both as a source of energizing potential for the relays 17, 18 and 19 and as a collector supply for the transistor switches 10, 11 and 12.

The emitter 24 of the transistor switch 10 is connected to a D.C. bias supply, such as a battery 26, which tends to forward bias the base-emitter junction thereof; the emitter 27 of the transistor switch 11 is connected directly to ground; and the emitter 28 of the transistor switch 12 is connected to the resistor 21 and, thence, to ground.

The respective bases 29 and 31 of the transistor switches 13 and 14 are connected through respective resistors 32 and 33 to a junction point 34, and the base 36 of the transistor switch 12 is connected through series resistors 37 and 38 to the junction point 34, a capacitor 39 being connected from a point intermediate resistors 37 and 38 to ground.

The value of the resistor 32 connected to the base 29 of the transistor switch 10 is selected so that it is lower than either the value of the resistor 33 connected to the base 31 of the transistor switch 11 or the combined values of the resistors 37 and 38 connected in the base-emitter circuit of the transistor switch 12. Accordingly, since the transistor switch 10 is also forward biased by the battery 26, it will operate, i.e., conduct, at a lower voltage than either the transistor switch 11 or 12. Additionally, as a result of operating at a lower voltage than either the transistor switch 11 or 12, when a voltage sufficient to operate all three transistor switches is applied to the junction point 34, the transistor switch 10 will operate in a faster time than either the transistor switch 11 or 12. Transistor switch 11, in turn, for the situation just described, will operate in a faster time than the transistor switch 12 by virtue of a time delay circuit formed by the resistor 38 and the capacitor 39 in the base circuit of the transistor switch 12. Operation of any one of the transistor switches 10, 11 or 12, it is readily seen, causes energization of the relay connected in its collector circuit.

The junction point 34 is connectable to a junction point 41 through a set of make-before-break contacts 42a—42a of a relay 42, which, in turn, is connected to one end of the start switch 23 and to ground. The relay 42 which may be a Western Electric Company type AK-4 is selected so that the transfer time of its armatures, i.e., transit time, is greater than the time required for operation of the transistor switch 12 and its relay 19, the transistor switch 12, as previously pointed out, being the slowest to operate of the three transistor switches 10, 11 and 12. This assures that all three transistor switches 10, 11 and 12 and their respective relays 17, 18 and 19 will operate, if at all, within the transfer time of the relay 42. The reason for this requirement will readily become apparent from the description hereinbelow of the operation of the apparatus.

The junction point 41 is connected to an armature 18b of the relay 18. A normally open contact 18c associated with the armature 18b is connected to a terminal 43 and a normally closed contact 18d associated therewith is connected to a terminal 44. Additionally, the terminal 43 is connected to another normally closed contact 18e of the relay 18 and the terminal 44 is connected to another normally open contact 18f thereof, an armature 18g associated with these latter-mentioned contacts being connected to ground.

The terminals 43 and 44 are adapted for receiving the leads of an asymmetrically conducting device 46 to be tested, which, in the embodiment of the invention illustrated in the drawing is a semiconductor diode; however, it should be noted that this is merely for purposes of illustration and that the invention may be employed to test any other type of asymmetrically conducting device.

In the condition of the circuit shown in the drawing, terminal 43 is connected to ground through the normally closed contact 18e and the armature 18g, and the terminal 44 is connected to junction point 41 through the normally closed contact 18d and the armature 18b. However, upon transfer of the armatures 18b and 18g the terminal 43 becomes connected to junction point 41 through the normally open contact 18c and the armature 18b, and the terminal 44 becomes connected to ground through the normally open contact 18f and the armature 18g.

The junction point 41 is also connected to an armature 42b of a second set of make-before-break contacts of the relay 42. A contact 42c associated with the armature 42b is connected through a resistor 47 to a suitable source of D.C. voltage, such as a battery 48, and a contact 42d associated therewith is connected to one end of a resistor 49. A D.C. voltage source, such as a battery 51, is provided for connection to either a short-circuit indicating unit such as a lamp 52, an open-circuit indicating unit, such as a lamp 53, or to the other end of the resistor 49 through a bank of relay contacts, which includes a pair of normally open break-before-make contacts 42c and 42f of the relay 42, a normally open and a normally closed contact 17b and 17c, respectively, of the relay 17 and a normally open and a normally closed contact 19b and 19c, respectively, of the relay 19.

*Operation*

In operation, a device 46 to be tested is connected to the terminals 43 and 44 in the manner shown, and the start switch 23 is depressed to energize the relay 42. Shortly thereafter, both sets of make-before-break contacts of the relay 42 close to interconnect the junction points 34 and 41 and to apply a test current to the device 46. The duration of the interconnection of junction points 34 and 41 and the application of test current to the device 46 is governed, of course, by the transit time of the relay 42, which, if of the Western Electric AK-4 type, has a transit time of approximately 20 milliseconds. The circuit path for the test current to the device 46 is traced from the negative terminal of the battery 48 through the resistor 47, the contact 42c, the contact 42d, the armature 42b, the junction point 41, the armature 18b, the contact 18d, the terminal 44, the device 46, the terminal 43, the contact 18e and the armature 18g to ground. The voltage developed across the device 46 and, hence, at the junction points 34 and 41, depends upon whether the device is short-circuited, open-circuited, connected, as shown, in a forward direction with respect to the battery 48, or connected in a reverse direction with respect to the battery 48.

Taking the short-circuit condition first, if the device is short-circuited the terminal 44 and hence, the junction point 41 will be essentially at the same potential as the terminal 43, that is, ground. This potential is then applied from the junction point 41 through the set of contacts 42a—42a to the junction point 34 and thence, to each of the transistor switches 10, 11 and 12. Because of the circuit parameters associated with each of the transistor switches 10, 11 and 12, this potential is insufficient to operate any one of them to its "ON" state. Accordingly, at the end of the transit time of the relay 42 its break-before-make contacts 42e and 42f close and an actuating signal is applied from the source 51 to the short-circuit indicating lamp 52, the path therefor being traced from the source 51, through the contact 42e, the contact 17c and the contact 42f to the short-circuit indicating lamp 52.

If the device 46 is either open-circuited or connected to the terminals 43 and 44 in a reverse manner to that shown, i.e., connected in a reverse direction with respect to the battery 48, upon the closure of both sets of make-before-break contacts of the relay 42 a relatively high voltage, essentially equal to the output voltage of the battery 48 and sufficient to operate each of the transistor switches 10, 11 and 12 to its respective "ON" state, appears at the junction points 34 and 41. The transistor switch 10 turns "ON" first, resulting in energization of the relay 17 to close the contacts 17a and 17b and to open the contact 17c. The closure of contact 17a establishes a holding circuit for the relay 17 and the opening of the contact 17c disables the short-circuit indicating lamp 52. Shortly thereafter, the transistor switch 11 turn "ON" to energize the relay 18, thereby effecting a closure of the contacts 18a, 18c and 18f and an opening of the contacts 18d and 18e. The closure of the contact 18a provides a holding circuit for the relay 18 while the closure of the contacts 18c and 18f and the opening of contacts 18d and 18e effects a reversal of the terminals 43 and 44 to reverse the polarity of the device 46 with respect to the battery 48.

If the device is open-circuited, upon its reversal, no substantial change in the voltage appearing at junction points 34 and 41 results and, after another time interval, governed by the resistor 38-capacitor 39 time delay network, the transistor switch 12 operates to its "ON" state, thereby causing energization of the relay 19 and a closure of the contacts 19a and 19b and an opening of the contact 19c. Accordingly, at the end of the transit time of the relay 42, a signal from the source 51 is applied to the open-circuit indicating lamp 53 to indicate an open circuit. The path for this open-circuit indicating signal is traced from the source 51 through the contact 42e, the contact 17b, and the contact 19b to the open-circuit indicating lamp 53.

If the device 46 was initially connected in the reverse direction with respect to the battery 48, upon its reversal it will be connected in its forward direction and a relatively low voltage, insufficient to operate transistor switch 12, will appear at junction points 34 and 41. Accordingly, at the end of the transit time of the relay 42, a signal from the source 51 to condition or bias the device 46 for further testing will be applied to the device. The path for the conditioning signal is traced from the source 51 through the contact 42e, the contact 17b, the contact 19c, the resistor 49, the contact 42d, the armature 42b, the junction point 41, the armature 18b, the contact 18c, the terminal 43, the anode of the device 46, the cathode thereof, the terminal 44, the contact 18f and the armature 18g to ground.

If the device is initially connected in the forward direction with respect to the battery 48 and is neither open, nor short-circuited, a voltage, relatively low, but higher than that developed for the short-circuit situation and sufficient only to turn "ON" the transistor switch 10 appears at junction points 34 and 41. Accordingly, only the transistor switch 10 is turned "ON" during the transit time of the relay 42, the other transistor switches 11 and 12 remaining in their respective "OFF" states during this interval resulting at the end of the end of the transit time of the relay 42, in a conditioning signal from the source 51 being supplied to the device 46. The path for this conditioning signal is traced from the source 51, through the contact 42e, the contact 17b, the contact 19c, the resistor 49, the contact 42d, the armature 42b, the junction point 41, the armature 18b, the contact 18d, the terminal 44, the anode of the device 46, the cathode thereof, the terminal 43, the contact 18e and the armature 18g to ground.

In summary, if the device 46 is short-circuited none of the transistor switches 10, 11 or 12 will operate and, at the end of the transit time of the relay 42, a signal from the battery 51 will be applied to the short-circuit indicating lamp 52; if the device 46 is open-circuited, all three transistor switches will operate, resulting, at the end of the transit time of the relay 42, in a signal from the battery 51 being applied to the open-circuit indicating lamp 53; if the device 46 is neither open nor short-circuited but is initially connected to the terminals 43 and 44 in a reverse manner to that shown in the drawing, only the transistor switches 10 and 11 will operate, resulting in the device 46 being properly oriented at the end of the transit time of relay 42 to receive a conditioning signal from the battery 51; and, finally, if the device 46 is neither short nor open-circuited and is connected to the terminals 43 and 44 in the manner shown in the drawing, only the transistor switch 10 operates during the transit time of the relay 42, resulting in the short-circuit indicating lamp being disabled and a conditioning signal from the battery 51 being applied to the device 46.

It should be apparent that while the transistor switch 10 has been described as operating prior to transistor switches 11 and 12, this is only an incidence of its operating at a lower voltage, and is not necessary for proper operation of the apparatus. The only requirement placed timewise on the transistor switch 10 for proper operation is that it must operate within the transit time of the relay 42. The sequence of operations described hereinabove of the transistor switches 11 and 12, however, is important, since if the transistor switch 12 were to operate prior to the transistor switch 11 in the testing of a device 46 initially connected to the terminals 43 and 44 in a reverse manner, an open-circuit would be indicated before transistor switch 11 could effect a reversal thereof. Accordingly, the operating sequence of the transistor switches 11 and 12 must be maintained in order to assure proper operation of the apparatus. Of course, these latter-mentioned transistor switches also have the requirement that they operate prior to the expiration of the transit time of the relay 42.

It is to be understood that the above-described arrangement is simply illustrative of the application of the principles of the invention. Various modifications and embodiments of the invention may be made within the spirit and scope thereof.

What is claimed is:

1. Apparatus for testing asymmetrically conducting electrical devices, which comprises:
   means for supplying a unidirectional test current connected during a predetermined time interval to an asymmetrically conducting electrical device to be tested, the magnitude of the voltage appearing across said device being dependent upon the conductivity thereof relative to the supplying means;
   first voltage responsive means connected to said device during said predetermined time interval and operable from a first state to a second state, said means operating to said second state during said time interval if the conductivity of the device relative to the supplying means is lower than a first predetermined value thereof, and said means not operating to said second state and remaining in said first state if the conductivity of the device relative to the supplying means is higher than said first predetermined value;
   second voltage responsive means connected to said device during said predetermined time interval and operable from a first state to a second state, in said second state said second voltage responsive means causing reversal of said device with respect to the supplying means, said second voltage responsive means operating to said second state during said predetermined time interval if the conductivity of the device relative to the supplying means is lower than a second predetermined value thereof, less than the first, and said second means not operating to said second state and remaining in said first state if the conductivity of the device relative to the supplying means is higher than said second predetermined value; and
   third voltage responsive means connected to said device during said predetermined time interval and operable from a first state to a second state, said third voltage responsive means operating to said second state at a time subsequent to the operation of said second voltage responsive means if upon reversal of the device the conductivity thereof relative to the supplying means is lower than said second predetermined value, said third means not operating to said second state and remaining in said first state for all other conditions of the device.

2. Apparatus in accordance with claim 1 further comprising means responsive to nonoperation of said first voltage responsive means during said predetermined time interval for indicating that the conductivity of the device relative to the supplying means is higher than said first predetermined value thereof, and means responsive to operation of said third voltage responsive means during said predetermined time interval for indicating that the conductivity of the device relative to the supplying means after reversal thereof is lower than said second predetermined value thereof.

3. Apparatus for testing asymmetrically conducting electrical devices to determine whether said devices are short-circuited, open-circuited or of undesirable orientations and for orienting those of an undesirable orientation to a desirable one, which comprises:
   first, second and third relays;
   first, second and third voltage responsive circuits coupled respectively to said first, second and third relays, said first circuit causing operation of said first relay when a voltage having a magnitude greater than a first predetermined value is applied thereto for a first predetermined time interval, said second circuit causing operation of said second relay when a voltage having a magnitude equal to, or greater than, a second predetermined value is applied thereto for a second predetermined time interval, and said third circuit causing operation of said third relay when a voltage having a magnitude equal to, or greater than, said second value is applied thereto for a third time interval greater than said second time interval;
   a source of electrical power connectable to a device to be tested for applying unidirectional electrical power thereto;
   a short-circuit indicating unit;
   an open-circuit indicating unit;
   first, second and third sets of contacts controlled respectively by said first, second and third relays, said first set of contacts causing actuation of said short-circuit indicating unit upon nonoperation of said first relay, said second set of contacts adapted to receive said device and present it to said power source in one polarity orientation while said second relay remains inoperative and to present it to said power source in the opposite polarity orientation upon operation of said second relay, and said third set of contacts causing actuation of said open-circuit indicating unit upon operation of said third relay; and
   switching means for connecting the device to said power source and to said first, second and third voltage responsive circuits whereby said first value of voltage appears across said device if said device is short-circuited and said second value of voltage appears across said device if said device is open-circuited or poled in the reverse direction with respect to said power source.

4. Apparatus in accordance with claim 3 wherein said first, second and third voltage responsive circuits include first, second and third transistors respectively, said first transistor having a biasing supply in its input circuit and said third transistor having a time delay network in its input circuit, whereby said first transistor operates at a lower voltage than said second or third transistors, and said second transistor operates in a faster time than said third transistor.

5. Apparatus in accordance with claim 3 wherein said switching means comprises a relay having make-before-break contacts, said testing taking place during the transit time of said relay.

6. Apparatus for testing asymmetrically conducting electrical devices to determine whether said devices are short-circuited, open-circuited or of undesirable polarity orientations for further testing thereof and for orienting those of an undesirable polarity orientation to a desirable one, which comprises:
   first, second and third transistor switches, said first transistor switch operating from a nonconducting to a conducting state when a voltage having a magnitude greater than a first predetermined value is applied to the input of said switch for a first predetermined time interval, said second transistor switch operating from a nonconducting to a conducting state when a voltage having a magnitude equal to, or greater than, a second predetermined value is applied to the input of said switch for a second predetermined time interval, and said third transistor switch operating from a non-conducting to a conducting state when a voltage having a value equal to, or greater than, said second value is applied to the input of said switch for a third predetermined time interval, greater than said second predetermined time interval;

first, second and third relays connected respectively in the outputs of said first, second and third transistor switches, each of said relays operating upon operation of its respective transistor switch to its conducting state;

a first source of electrical power, said source being connectable to an asymmetrically conducting device to be tested for applying unidirectional power thereto;

a second source of electrical power;

a short-circuit indicating unit;

an open-circuit indicating unit;

first, second and third sets of contacts controlled respectively by said first, second and third relays, said first set of contacts being operable to condition said short-circuit indicating unit for actuation upon nonoperation of said first relay, said second set of contacts adapted to receive said device and present it to said power source in one polarity orientation while said second relay remains inoperative and to present it to said power source in the opposite polarity orientation upon operation of said second relay, said third set of contacts operable to condition said open-circuit indicating unit for actuation upon operation of said third relay; and a relay having make-before-break contacts for connecting said device to said first source and to the respective inputs of said first, second and third transistor switches, said first value of voltage appearing across said device if said device is short-circuited and said second value of voltage appearing across said device if said device is open-circuited or poled in the reverse direction with respect to said power source, and said relay also having break-before-make contacts for applying a signal from said second source to either said short-circuit indicating unit, said open-circuit indicating unit or to said device in accordance with operation or nonoperation of said first, second and third relays.

7. Apparatus for testing diodes to determine whether they are short-circuited, open-circuited or of undesirable polarity orientations for further testing thereof and for orienting those of an undesirable polarity orientation to a desirable one, which comprises:

first, second and third transistor switches, said first transistor switch operating from a nonconducting to a conducting state when a voltage having a magnitude greater than a first predetermined value is applied to the input of said switch for a first predetermined time interval, said second transistor switch operating from a nonconducting to a conducting state when a voltage having a magnitude equal to, or greater than, a second predetermined value is applied to the input of said switch for a second predetermined time interval, greater than said first interval, and said third transistor switch operating from a nonconducting to a conducting state when a voltage having a value equal to, or greater than, said second value is applied to the input of said switch for a third predetermined time interval, greater than said second predetermined time interval;

first, second and third relays connected respectively in the outputs of said first, second and third transistor switches, each of said relays operating upon operation of its respective transistor switch to its conducting state;

a first source of electrical power, said source being connectable to a diode to be tested for applying unidirectional power thereto;

a second source of electrical power;

a short-ciruit indicating unit;

an open-circuit indicating unit;

first, second and third sets of contacts controlled respectively by said first, second and third relays, said first set of contacts being operable to condition said short-circuit indicating unit for actuation upon nonoperation of said first relay, said second set of contacts adapted to receive said diode and present it to said power source in one polarity orientation while said second relay remains inoperative and to present it to said power source in the opposite polarity orientation upon operation of said second relay, said third set of contacts operable to condition said open-circuit indicating unit for actuation upon operation of said third relay; and a relay having make-before-break contacts for connecting said diode to said first source and to the respective inputs of said first, second and third transistor switches, said first value of voltage appearing across said diode if said diode is short-circuited and said second value of voltage appearing across said diode if said diode is open-circuited or poled in the reverse direction with respect to said power source, and said relay also having break-before-make contacts for applying a signal from said second source to either said short-circuit indicating unit, said open-circuit indicating unit or to said diode in accordance with operation or nonoperation of said first, second and third relays.

No references cited.

WALTER L. CARLSON, *Primary Examiner.*
E. L. STOLARUN, *Assistant Examiner.*